(12) United States Patent
Bohling et al.

(10) Patent No.: US 10,947,392 B2
(45) Date of Patent: Mar. 16, 2021

(54) HYDROPHOBIC PIGMENT MODIFICATION

(71) Applicants: Rohm and Haas Company, Collegeville, PA (US); THE REGENTS OF THE UNIVERSITY OF CALIFORNIA, Berkeley, CA (US)

(72) Inventors: James C. Bohling, Lansdale, PA (US); Alexander Katz, Richmond, CA (US); Manish Mishra, Berkeley, CA (US); Clayton J. Radke, El Cerrito, CA (US); Antony K. Van Dyk, Blue Bell, PA (US)

(73) Assignees: Rohm and Haas Company, Collegeville, PA (US); The Regents of the University of California, Berekeley, CA (US)

( * ) Notice: Subject to any disclaimer, the term of this patent is extended or adjusted under 35 U.S.C. 154(b) by 65 days.

(21) Appl. No.: 16/373,809

(22) Filed: Apr. 3, 2019

(65) Prior Publication Data
US 2019/0309172 A1 Oct. 10, 2019

Related U.S. Application Data

(60) Provisional application No. 62/653,077, filed on Apr. 5, 2018.

(51) Int. Cl.
*C09D 5/00* (2006.01)
*C09C 1/36* (2006.01)
*C09D 17/00* (2006.01)

(52) U.S. Cl.
CPC ............ *C09C 1/3684* (2013.01); *C09D 5/00* (2013.01); *C09D 17/001* (2013.01); *C09D 17/008* (2013.01)

(58) Field of Classification Search
None
See application file for complete search history.

(56) References Cited

U.S. PATENT DOCUMENTS

| | | | | |
|---|---|---|---|---|
| 3,816,152 A * | 6/1974 | Yates | ...................... | C03C 25/40 106/287.12 |
| 5,223,030 A * | 6/1993 | Valette | .................... | B22C 1/205 106/38.2 |
| 5,501,732 A * | 3/1996 | Niedenzu | .............. | C09C 1/3684 106/287.16 |
| 6,214,106 B1* | 4/2001 | Weber | ................... | C09C 1/3684 106/442 |
| 2007/0218297 A1* | 9/2007 | Jeon | ........................ | B82Y 30/00 428/447 |
| 2011/0064942 A1* | 3/2011 | Sawada | ................. | H01L 51/448 428/328 |
| 2012/0316266 A1 | 12/2012 | Koyama | | |
| 2017/0022384 A1* | 1/2017 | Jankolovits | ............... | C09C 1/02 |

FOREIGN PATENT DOCUMENTS

| EP | 1544257 | | 6/2005 | |
|---|---|---|---|---|
| JP | 200334373 A | * | 12/2000 | .............. B05D 7/00 |
| WO | 1995023194 | | 8/1995 | |
| WO | 2000046029 | | 8/2000 | |

OTHER PUBLICATIONS

Jankolovits et al., "Stable Aqueous Dispersions of Hydrophobically Modified Titanium Dioxide Pigments through Polyanion Adsorption: Synthesis, Characterization, and Application in Coatings", Langmuir, 2016, 32:1929-1938.

Ramanathan et al., "Novel liquid-solid adhesion superhydrophobic surface fabricated using titanium dioxide and trimethoxypropyl silane", Applied Surface Science, 2012, 258:7950-7955.

\* cited by examiner

*Primary Examiner* — Peter A Salamon
(74) *Attorney, Agent, or Firm* — Riverside Law LLP

(57) ABSTRACT

The present invention is a composition comprising an aqueous dispersion of metal oxide pigment particles coated with a polymer comprising structural units of an alkyltrihydroxysilane or a salt thereof and a dialkyldihydroxysilane or a salt thereof. The composition of the present invention provides hydrophobicity to pigment particles, thereby imparting water resistance, and allows for high loadings of pigment in water without increased viscosity.

10 Claims, No Drawings

HYDROPHOBIC PIGMENT MODIFICATION

CROSS-REFERENCE TO RELATED APPLICATIONS

The present application claims priority to U.S. Provisional Patent Application No. 62/653,077, filed Apr. 5, 2018, which is incorporated by reference herein in its entirety.

BACKGROUND OF THE INVENTION

The present invention relates to the modification of the surface of pigment particles with a hydrophobic material.

Performance of water-borne paint formulations is influenced in part by the surface chemistry of the inorganic pigment used to opacify the paint. Pigments such as the widely used $TiO_2$ tend to be hydrophilic in their native state and therefore not particularly effective as a barrier to penetration of water, ions, and water-soluble colorants at the pigment-binder interface. For this reason, it would be advantageous to modify the surface of inorganic pigment particles to provide coatings with improved resistance to stains and corrosion.

The dispersion stability of pigment particles in the paint formulation affects the hiding efficiency of the consequent film. Pigment aggregates provide less hiding than isolated primary particles; therefore, it would be further advantageous to modify the surface of pigment particles to minimize pigment aggregation in films, thereby reducing the amount of pigment needed in the formulation.

It is known in the art to modify the surface of pigment particles with hydrophobic groups. For example, US 2017/0022384 A1 discloses an aqueous dispersion of inorganic pigment particles modified with polysiloxane or silyl groups. In theory, hydrophobically modified pigment particles would be expected to improve barrier properties, thereby improving hiding. Nevertheless, in practice, formulators continue to experience difficulty in dispersing hydrophobically modified pigment particles in water because of their poor wettability and the poor stability of the aqueous dispersions of the hydrophobically modified pigment particles. The use of dispersing agents (dispersants and surfactants) can address these issues in part, but dispersing agents present problems of their own, including limiting film formation, increasing water sensitivity, increasing permeability to ions and polar compounds, disrupting adhesion to certain substrates, and promoting exudation (oozing) of non-film forming additives such as surfactants, defoamers, coalescents, and dispersants to the surface of the coating.

It would therefore be advantageous to increase pigment volume concentrations of aqueous dispersions of hydrophobically modified pigments to above 37 volume percent without concomitant increase in viscosity, and further be advantageous to be able to disperse pigment in while substantially reducing, or even eliminating the use of ancillary dispersing agents.

SUMMARY OF THE INVENTION

The present invention addresses a need in the art by providing, in a first aspect, a composition comprising an aqueous dispersion of metal oxide pigment particles coated with an organosilane polymer comprising structural units of an alkyltrihydroxysilane or a salt thereof and a dialkyldihydroxysilane or a salt thereof, wherein the mole:mole ratio of structural units of the alkyltrihydroxysilane or a salt thereof to dialkyldihydroxysilane or a salt thereof is in the range of 99.9:1 to 50:50, and wherein the aqueous dispersion has a pH in the range of from 7.5 to 12.

In a second aspect, the present invention is a method for preparing an aqueous dispersion of hydrophobically modified pigment particles comprising the step of contacting, in the presence of water and at a pH of from 7.5 to 12, metal oxide pigment particles with an alkyltrihydroxysilane or a salt thereof and a dialkyldihydroxysilane or a salt thereof.

The present invention provides an aqueous dispersion of hydrophobically modified pigment particles at a high solids content at an acceptably low viscosity and can be prepared without ancillary dispersants. Such dispersions form coatings that are remarkably water-resistant.

DETAILED DESCRIPTION OF THE INVENTION

In a first aspect, the present invention is a composition comprising an aqueous dispersion of metal oxide pigment particles coated with an organosilane polymer comprising structural units of an alkyltrihydroxysilane or a salt thereof and a dialkyldihydroxysilane or a salt thereof, wherein the mole:mole ratio of structural units of the alkyltrihydroxysilane or a salt thereof to dialkyldihydroxysilane or a salt thereof is in the range of 99.9:1 to 50:50, and wherein the aqueous dispersion has a pH in the range of from 7.5 to 12.

As used herein, a structural unit of an alkyltrihydroxysilane refers to the following fragment:

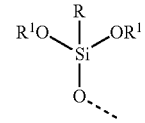

where R is an alkyl group, preferably a $C_1$-$C_{18}$-alkyl group, more preferably a $C_1$-$C_4$-alkyl group and most preferably methyl; and each $R^1$ is independently H, a bond to the pigment particle; M, or another Si atom; wherein M is an alkali metal or ammonium counterion, preferably a lithium, a sodium, or a potassium counterion; and the dotted line represents the point of attachment of the oxygen atom to the pigment particle.

As used herein, a structural unit of a dialkyltrihydroxysilane refers to the following fragment:

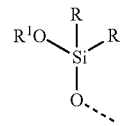

where each R is independently an alkyl group, preferably a $C_1$-$C_{18}$-alkyl group, more preferably a $C_1$-$C_4$-alkyl group and most preferably methyl; and each $R^1$ is independently H, a bond to the pigment particle; M, or another Si atom; wherein M is an alkali metal or ammonium counterion, preferably a lithium, a sodium, or a potassium counterion; and the dotted line represents the point of attachment of the oxygen atom to the pigment particle.

The mole:mole ratio of the alkyltrihydroxysilane to the dialkydihydroxysilane is in the range of from 50:50, preferably from 60:40, and more preferably from 65:35, to 99:1, preferably to 90:10, and more preferably to 85:15, and most preferably to 80:20. Preferably, at least 90, more preferably at least 95 weight percent of the organosilane polymer comprises structural units of the alkyltrihydroxysilane and the dialklydihydroxysilane. The organosilane polymer may also comprise from 0.01 to 10 weight percent, based on the weight of the organosilane polymer, structural units of an ancillary monomer.

In one embodiment of the present invention, 100 weight percent of the organosilane polymer comprises structural units of the alkyltrihydroxysilane and the dialklydihydroxysilane or salts thereof.

In one aspect, the aqueous dispersion of hydrophobically modified metal oxide pigment particles may be prepared by a) contacting metal oxide pigment particles, or an aqueous dispersion of metal oxide pigment particles, with a base to form basified metal oxide pigment particles or an aqueous dispersion of basified metal oxide particles, then b) contacting the basified metal oxide particles with the organosilane in the presence of water and at a pH in the range of from 7.5, preferably from 8.5, more preferably from 9, and most preferably from 9.2 to 12, preferably to 11, more preferably to 10, and most preferably to 9.8, to form the aqueous dispersion of hydrophobically modified pigment particles. In this aspect, it is preferred in the first step that an aqueous dispersion of metal oxide pigment particles are contacted with a base to form an aqueous dispersion of basified metal oxide particles. The alkyltrihydroxysilane and dialkyldihydroxysilane are advantageously converted to their corresponding salts in aqueous solution, prior to contacting with the aqueous dispersion of basified pigment particles. Preferably, the alkyltrihydroxysilane and dialkyldihydroxysilane, more preferably methyltrihydroxysilane and dimethyldihydroxysilane are contacted with the pigment particles as an aqueous mixture adjusted to a pH of >12.

In another embodiment, the pigment particles may be contacted with the organosilane without base pre-treatment.

The most preferred alkyltrihydroxysilane, methyltrihydroxysilane, can be obtained commercially or prepared in situ by aqueous alkali metal hydroxide hydrolysis of polymethylhydrosiloxane (PMHS) at a pH of >12. It has been found to be particularly advantageous for storage stability to maintain an aqueous solution of the methyltrihydroxysilane at a high pH until contact with the pigment particles to minimize self-condensation of the methyltrihydroxysilane. The most preferred dialkyldihydroxysilane, dimethyldihydroxysilane, is advantageously prepared by hydrolysis of dimethoxydimethylsilane with a strong base such as KOH.

It is further advantageous to maintain a pH in the range of 9 to 10, more preferably from 9.2 to 9.8 during the organosilane addition step through separate and concomitant addition of a strong acid to the pigment particles or basified pigment particles.

As used herein, metal oxide particles include both metal oxide and metalloid oxide particles, examples of which include oxides and carbonates of titanium, aluminum, silicon, iron, calcium, magnesium, zirconium, or zinc, and mixtures thereof. Examples of preferred pigment particles include $CaCO_3$, $Al_2O_3$, $SiO_2$, and $TiO_2$ pigment particles. $TiO_2$ pigment particles include rutile and anatase $TiO_2$, as well as $TiO_2$ surface treated with a variety of metal oxides and hydroxides including alumina, silica, and zirconia.

The average particle size of the metal oxide pigment particles is preferably from 10 nm, more preferably from 20 nm, more preferably from 50 nm, more preferably from 100 nm, more preferably from 200 nm, and most preferably from 240 nm, to preferably 5 µm, more preferably to 1 µm, more preferably to 500 nm, more preferably to 400 nm, and most preferably to 300 nm. Average particle size of the metal oxide pigment particles is defined by the average particle size determined by dynamic light scattering using a Malvern Zetasizer Nano Particle Size Analyzer.

The base used to pre-treat pigment particles—where it is desirable to pre-treat the particles—include amines such as trimethylamine, triethylamine, dimethylamine, diethylamine, 2-amino-2-methyl-1-propanol, piperidine, and piperazine; amino acids such as arginine, histidine, and lysine; iminoalkydiamines such as guanidine; purines such adenine; pyrimidines such as cytosine; ammonium hydroxide; quaternary tetra-$C_1$-$C_{12}$-alkyl ammonium hydroxides such as tetramethylammonium hydroxide, tetraethylammonium hydroxide, and tetrabutylammonium hydroxide; and alkali metal hydroxides such as LiOH, NaOH, and KOH. The base is preferably used stoichiometrically or in stoichiometric excess with respect to base-reactive sites of the pigment particles. Such reactive sites include acidic OH groups and Lewis acid metal cations such as $Al^{III}$, $Ti^{IV}$, $Zr^{IV}$, $Zn^{IV}$, $Ca^{II}$, and $Mg^{II}$.

The alkyltrihydroxysilane and dialkyldihydroxysilane are advantageously added to the pigment particles in a sufficient amount to convert the pigment particles to hydrophobically modified pigment particles. The term "hydrophobically modified" means that the modified pigment particles have <25% by weight water uptake relative to the unmodified dry pigment particles at 90% relative humidity as measured using a DVS Advantage ET Analyzer (Surface Measurement Systems).

The organosilanes bind to the pigment particles to form the hydrophobic organosilane polymer coating comprising structural units of the alkyltrihydroxysilane and the dialkyldihydroxysilane. Preferably, for a pigment particle having a particle size in the range of from 250 nm to 350 nm, the wt. % Si in the organosilane polymer and arising from addition of the alkyltrihydroxylsilane and the dialkyldihydroxysilane with respect to the pigment particles is preferably in the range of from 0.1, more preferably from 0.5, and most preferably from 1 wt. %, to preferably 4, and more preferably to 3 wt. %. Alternatively, the concentration of Si atoms in the organosilane polymer and arising from addition of the alkyltrihydroxylsilane and the dialkyldihydroxysilane to the basified pigment particles, is preferably in the range of from 4, more preferably from 10, and most preferably from 20 Si atoms/$nm^2$ of the external pigment surface area to preferably 120, more preferably to 100, more preferably to 80, and most preferably to 60 Si atoms/$nm^2$ of external pigment surface area. As used herein, external pigment surface area refers to the geometrical external surface area of a sphere having the same diameter as a pigment particle, as measured by dynamic light scattering, as performed using Malvern Zetasizer Nano Particle Size Analyzer. The extent of alkyltrihydroxylsilane and dialkyldihydroxysilane incorporation onto the pigment particles is determined by digestion followed by Si analysis by inductively coupled plasma-atomic emission spectroscopy (ICP-AES).

It has surprisingly been discovered that an aqueous dispersion of self-dispersing hydrophobically modified pigment particles with a small amount or no added dispersing agent, which can be a dispersant or a surfactant, can be prepared at a volume solids fraction of 0.37 to 0.5 (corresponding to ~70 to 80 wt. % solids for Ti-Pure R706 $TiO_2$) without any significant increase in slurry viscosity as compared with the unmodified slurry of pigment with a dispersing agent at the same concentration. Thus, for a 70 weight percent solids (0.37 volume solids fraction) aqueous slurry comprising the hydrophobically-modified pigment particles, shear stresses are preferably not greater than 0.03 Pa, at a shear rate at 0.1 s$^{-1}$ without ancillary dispersing agents.

The viscosities for the same slurry are preferably not greater than 0.4 Pa·s at a shear rate of 0.1 s$^{-1}$, and preferably not greater than to 0.03 Pa·s at a shear rate of 100 s$^{-1}$ without ancillary dispersants. These viscosities are ~35- to 450-fold higher than that of water, and are easily pourable liquid-like slurries. The presence of a small amount of a dispersing agent has been found to further improve shear stress and viscosity but the rheology properties are quite acceptable even in the absence of the dispersing agent.

For a 75 weight percent solids (0.43 volume solids fraction) aqueous slurry comprising the hydrophobically-modified pigment particles, shear stresses are preferably not greater than 0.22 Pa at a shear rate of 0.1 s$^{-1}$. The viscosities for the same slurry in the absence of an ancillary dispersing agent are preferably not greater than 2.2 Pa·s at a shear rate of 0.1 s$^{-1}$ and preferably not greater than to 0.035 Pa·s at a shear rate of 100 s$^{-1}$. In the presence of as little as 0.08 wt. % with respect to pigment mass of a surfactant such as TRITON™ X-100 Surfactant (A Trademark of The Dow Chemical Company or its Affiliates), a substantial decrease in shear stress to 0.06 Pa at a shear rate of 0.1 s$^{-1}$ has been observed. Also, in the presence of this small amount of the surfactant, the viscosity substantially decreased to 0.6 Pa·s at a shear rate of 0.1 s$^{-1}$, and not greater than 0.035 Pa·s at a shear rate of 100 s$^{-1}$. These viscosities are ~40- to 2500-fold higher than that of water and, again, are easily pourable liquid-like slurries.

For an 80-weight percent solid (0.50 volume solids fraction) an aqueous slurry comprising the hydrophobically-modified pigment particles, shear stresses are preferably not greater than 2.2 Pa at a shear rate of 0.1 s$^{-1}$. The viscosities for the same slurry are preferably not greater than 22 Pa·s at a shear rate of 0.1 s$^{-1}$ and preferably not greater than to 0.2 Pa·s at a shear rate of 100 s$^{-1}$. In the presence of a small amount of the dispersing agent, both the viscosity and the shear stress were not greater than 20 Pa·s and 2 Pa, respectively, at a shear rate of 0.1 s$^{-1}$. These viscosities are ~225- to 25,000-fold higher than that of water.

It has been discovered that the aqueous dispersions of the hydrophobically modified pigment particles can be achieved without an ancillary dispersing agent as required in the teachings of US 2017/0022384 A1. Accordingly, in another aspect of the invention, the composition of the present invention comprises a substantial absence of a dispersing agent, that is, less than 0.09, preferably less than 0.05, more preferably less than 0.01, and most preferably 0 weight percent of a dispersing agent, based on the weight of the pigment. The substantial absence of dispersing agent is particularly advantageous in coating formulations since dispersing agents, particularly anionic polymeric dispersants, limit film formation, promote corrosion, and increase water sensitivity of coatings and promote undesirable exudation of non-solids (e.g., salts and polyelectrolytes) to the interfaces of the coatings.

The preparation of the aqueous dispersion of the hydrophobically modified pigment particles is preferably carried out in the absence of organic solvents. (Although some small amount of a C$_1$-C$_4$-alcohol can, in principal, be generated in the process, these byproducts do not constitute organic solvents.) As such, the process of the present invention is advantaged over previously described pigment modification processes that require the use organic solvents. Accordingly, in another embodiment of the invention, the process of the present invention is carried out in the substantial absence of organic solvents, that is, using less than 5, more preferably less than 1, and most preferably 0 percent of added organic solvent, based on the weight of organic solvent and the unmodified pigment particles.

The composition of the present invention is suitable for coatings formulations, which includes a latex, and preferably one or more additional materials including defoamers, surfactants, thickeners, extenders, coalescents, biocides, and colorants. The composition provides coating compositions with improved water-resistance over pigment particles that are not hydrophobically modified, as demonstrated by the following examples.

EXAMPLES

Calculation of Amine Functionalization of Pigment Particles

The extent of amine functionalization was determined by acid-base back titration as described in ACS Catalysis 2014, 302-310.

Intermediate Example 1—Preparation of Mixtures of Methyltrihydroxysilane and Dimethyldihydroxysilane Monopotassium Salt A. Preparation of Methyltrihydroxysilane from Polymethylhydrosiloxane To a 3-neck plastic spinner flask was added 4 M KOH solution (244 mL). The solution was purged with N$_2$ for 15 min, after which time polymethylhydrosiloxane (PMHS, from Aldrich Cat. No. 176206, M$_n$=1700-3200 g/mol, CAS No. 63148-57-2, 36 mL) was added over 25 s, followed by further degassing. The resulting degassed solution was stirred at 600 rpm for 6 h under N$_2$. FTIR spectroscopic analysis confirmed conversion of all of the PMHS to methyltrihydroxysilane (MTHS). The solution was stored in a tightly capped container to prevent exposure to atmospheric carbon dioxide. The concentration of MTHS in water was 0.234 g/mL.

B. Preparation of Dimethyldihydroxysilane Monopotassium Salt

A Teflon round bottom flask capped with a rubber septum was placed in an ice bath and purged with N$_2$ for 10 min. Dimethyldimethoxysilane (11.6 mL, 95% v/v, density=0.88 g/mL) was then added to the flask through the septum by way of a needle and syringe. 4M KOH solution (20.2 mL, 0.08 moles of KOH) was added with stirring to the flask at a rate of 20 µL/5 s for 2 min, then at a rate 2.5 mL/min for the remainder of the addition. After completion of addition of KOH, the solution was stirred for an additional 10 min, followed by rotary evaporation removal of water and liberated methanol at 60° C. for 30 min, then at 70° C. for 15 min. The product (10.20 g) was obtained and identified by $^1$H and $^{29}$Si NMR spectroscopy as the monopotassium salt of dimethyldihydroxysilane (K-DMDS).

C. Preparation of Monomers Mixtures

Aqueous mixtures of methyltrihydroxysilane and dimethyldihydroxysilane (2.44-2.6-mL) were prepared by varying the mole ratio of MTHS and K-DMDS while keeping the total moles of Si constant at 6.06×10$^{-3}$ moles. Mixtures of MTHS and K-DMDS were prepared in the following mole ratios: 100:0, 95:05, 90:10, 85:15, 80:20, 75:25, 70:30, 65;35, 60:40, 55:45, 50:50, 45:55, 40:60, 35:65, 30:70, 25:75, 20:80, 15:85, 10:90, 5:95, and 0:100. For the 100:0 composition of MTHS to K-DMDS, 2.44 mL of MTHS solution (described in step A) was used. In the case of 0:100, 2.6 mL of the solution of K-DMDS (0.79 g solid K-DMDS dissolved in 1.9 mL water) was used for surface modification of pigment. For all the other compositions, required amounts of K-DMDS salt solution as well as MTHS solution were mixed to achieve the targeted molar ratio of MTHS to K-DMDS.

D. Preparation of a 75:25 Mixture of Methyltrihydroxysilane and Dimethyldihydroxysilane An aqueous solution of K-DMDS as prepared in Step B (0.20 g dissolved in 0.61 mL water) was added to a portion of the MTHS solution as prepared in Step A (1.83 mL) to form a 75:25 mole:mole mixture of MTHS:K-DMDS. The mixture was vortexed to obtain a transparent solution (2.6 mL), which was further used for hydrophobic modification of pigment. The pH of the resulting mixture was ~14.

Example 1—Hydrophobic Modification of $TiO_2$ with a 75:25 Mixture of Methyltrihydroxysilane and Dimethyldihydroxysilane at pH 9.5

A. Pre-Treatment of $TiO_2$ with Triethylamine

Ti-R706 $TiO_2$ powder (250 g), water (500 mL), TAMOL™ 1124 Dispersant (2.5 mL, A Trademark of The Dow Chemical Company or its Affiliates), and triethylamine (TEA, 2.5 mL) were added to 1-L round bottom flask to form a slurry, which was stirred with a motorized overhead mixer at 1950 rpm for 20 h. Excess amine was removed by transferring the slurry into centrifuge vessels in four equal parts and centrifuging at 14,000 rpm for 3 min. The solid mass collected after centrifugation was broken into small pieces with a spatula, followed by addition of water (250 mL) to each of the four parts. Each sample was subjected to vortex mixing for 5 min followed by ultrasonication for 5 min. The samples were centrifuged again at 14,000 rpm for 3 min resulting in wet pastes with a solids content of 83.8 wt. % $TiO_2$. The entire water-wash process was repeated four more times for each sample to create a slurry having an 83.8 wt. % solids that was free of any amine or ammonia odor. The amine not recovered by the extensive water washing step was considered to be bound to the surface of particles; the resulting particles were amine-functionalized $TiO_2$ particles.

The extent of amine functionalization of the $TiO_2$ particles was measured by acid-base back titration using 0.01 M HCl and 0.01 M NaOH, as described in ACS Catalysis 2014, 4, 302. It was found that 34 μmol/g of basic sites were available on the surface of the TEA treated $TiO_2$ particles (TEA-R706), which corresponds to a surface coverage of bound amine of 2 TEA molecules/$nm^2$ of total pigment surface area.

The capillary rise test was performed to assess the hydrophobicity of TEA-R706. The capillary rise test was carried out as follows: 2.5 mM bromothymol dye solution adjusted to pH 8 in aqueous HEPES buffer was used. A 1.5-mm diameter capillary tube blocked on one end with cotton was filled to a height of 4 cm with dried pigment powder. The capillary was then dipped in dye solution for 4 h and the rise of dye was measured with a ruler. The contact angle was subsequently calculated from the height of dye rise, using Washburn's equation. TEA-R706 exhibited a capillary rise of aqueous bromothymol blue dye of 3.2 cm, indicating that it was not a hydrophobic material.

B. Hydrophobic Modification of TEA-R706 with Methyltrihydroxysilane and Dimethyldihydroxysilane Mixtures TEA-R706 wet paste (13.6 g), TAMOL™ 1124 Dispersant (68 μL), two 10-mm $ZrO2$ beads, and water (0.2 mL) were placed in a plastic container and mixed with a Flacktek high-speed mixer at 1700 rpm for 2 min to form a slurry. Additional water (0.845 mL) was added to the slurry and further high shear mixing was carried out at 3500 rpm for 3 min in the absence of $ZrO2$ beads to form a slurry with a pigment solids content of 77.5 wt. %.

An aqueous mixture of MTHS (0.43 g) and K-DMDS (0.20 g) with an MTHS:K-DMDS mole-to-mole ratio of 75:25, was added to the slurry with concomitant addition of 2.0 M HCl (3.2 mL), to adjust the pH of the slurry to 9.5. The slurry was mixed at 3500 rpm for 3 min, after which time water (2.5 mL) was added, followed by vortexing for 4 h. The slurry was then washed with water (200 mL) and centrifuged at 14000 rpm for 5 min. The solid mass collected after centrifugation was broken down with a spatula and washed with water (200 mL) before being centrifuged again. This procedure was repeated two more times, and the resulting product was obtained as a wet paste with a $TiO_2$ solids content of 80 wt. %.

The product was dried for 24 h and its hydrophobicity was confirmed as follows: Dried powder (100 mg) was placed into a beaker filled with DI water (200 mL) and was observed for 2 h for evidence of settling. After 2 h, the powder was completely floatable on water with no observed settling of the powder, which provided strong evidence of hydrophobicity. A capillary rise test confirmed the hydrophobic nature of the material: no rise of an aqueous solution of bromothymol dye at pH 8 before and after the high shear stress test of the hydrophobic material at pH 8.7 was observed.

Hydrophobic Modification of $TiO_2$ Using a Range of MTHS/K-DMDS Combinations

Hydrophobic modification of R-706 pigment was performed with the other mole:mole ratios of MTHS and K-DMDS, substantially as described in Example 1. The results are summarized in Table 1. Rheology without surfactant (which acts as a dispersant) refers to rheology of a 75 wt. % slurry at 0.1 $s^{-1}$ shear rate, whereas rheology with surfactant refers to 0.08 wt. % TRITON X-100 Surfactant (X-100) relative to pigment weight.

| MTHS:K-DMDS mole:mole | Contact Angle | Rheology w/o Dispersing Agent | Rheology w/ X-100 | Hydrophobic? |
|---|---|---|---|---|
| 100:0 | >90° | Shear Stress: 0.56 Pa<br>Viscosity: 5.7 Pa · s | NA | Y |
| 95:5 | >90° | Shear Stress: 0.52 Pa<br>Viscosity: 5.2 Pa · s | Shear Stress: 0.18 Pa<br>Viscosity: 1.8 Pa · s | Y |
| 90:10 | >90° | Shear Stress: 0.70 Pa<br>Viscosity: 7.0 Pa · s | Shear Stress: 0.33 Pa<br>Viscosity: 3.3 Pa · s | Y |
| 85:15 | >90° | Shear Stress: 0.70 Pa<br>Viscosity: 7.0 Pa · s | Shear Stress: 0.15 Pa<br>Viscosity: 1.5 Pa · s | Y |
| 80:20 | >90° | Shear Stress: 0.19 Pa<br>Viscosity: 1.9 Pa · s | Shear Stress: 0.11 Pa<br>Viscosity: 1.1 Pa · s | Y |
| 75:25 | >90° | Shear Stress: 0.28 Pa | Shear Stress: 0.06 Pa | Y |

-continued

| MTHS:K-DMDS mole:mole | Contact Angle | Rheology w/o Dispersing Agent | Rheology w/ X-100 | Hydrophobic? |
|---|---|---|---|---|
| 70:30 | >90° | Viscosity: 2.8 Pa · s<br>Shear Stress: 0.38 Pa | Viscosity: 0.6 Pa · s<br>Shear Stress: 0.07 Pa | Y |
| 65:35 | >90° | Viscosity: 3.8 Pa · s<br>Shear Stress: 0.32 Pa | Viscosity: 0.7 Pa · s<br>Shear Stress: 0.17 Pa | Y |
| 60:40 | >90° | Viscosity: 3.2 Pa · s<br>Shear Stress: 0.04 Pa | Viscosity: 1.7 Pa · s<br>Shear Stress: 0.06 Pa | Y |
| 55:45 | >90° | Viscosity: 0.45 Pa · s<br>Shear Stress: 0.06 Pa | Viscosity: 0.6 Pa · s<br>Shear Stress: 0.22 Pa | Y |
| 50:50 | >90° | Viscosity: 0.6 Pa · s<br>Shear Stress: 0.12 Pa | Viscosity: 2.2 Pa · s<br>Shear Stress: 0.02 Pa | Y |
| 40:60 | ~90° | Viscosity: 1.1 Pa · s<br>NA | Viscosity: 0.2 Pa · s<br>NA | N |
| 35:65 | ~90° | NA | NA | N |
| 25:75 | ~90° | NA | NA | N |
| 10:90 | <90° | NA | NA | N |
| 0:100 | <90° | NA | NA | N |

Table 1 illustrates that hydrophobic $TiO_2$ particles are formed at mole:mole ratios of MTHS:K-DMDS in the range of 100:0 to 50:50. At MTHS:K-DMDS ratios in the range of from 100:0 to 85:15, the final surface modified pigment obtained after 24 h of drying exhibited a slow aqueous dispersion of 1-5% of total powder, within 2 h after a small amount (~100 mg) of the powder was contacted with water. At MTHS:K-DMDS ratios in the range of 80:20 to 65:35, the modified pigment particles were completely floatable, with no evidence of dispersion after 2 h of contact with water. At ratios in the range of 60:40 to 50:50, a slow dispersion of 1-5% of total powder was observed within 1 h after dry powder was contacted with water. At ratios below 50:50, the final product was found to be not hydrophobic in nature; the aqueous floatability test of dried product confirmed pigment sinking and dispersion of 70-90% of the total powder within 2 h after being contacted with water.

Table 1 also shows that compositions with MTHS:K-DMDS mole:mole ratios in the range of 80:20 to 65:35 rendered dispersions with exceptionally low viscosity and shear stress at minimum shear rate of 0.1 s$^{-1}$, even without a dispersing agent. The presence of a small amount of the dispersing agent was found to improve the shear stress/viscosity profile to an even greater extent.

Hydrophobically modified $TiO_2$ dispersions using MTHS and DMDS in the range of 80:20 to 65:35 were further analyzed for their hydrophobic properties as follows: A hydrophobically modified wet paste (80 wt. % solid content of Ti-R706) was diluted to 70 wt. %. A portion of this diluted slurry was placed on a glass substrate and drawn down with a 3-mil bar applicator to form a coating. The coating was dried for 48 h under ambient conditions. The coating was analyzed for contact angle using a goniometer and the static drop method. The coating obtained from pigment modification with a MTHS:DMDS ratio of 75:25 showed the greatest contact angle (130°±5°).

Hydrophobic modification was carried out using ammonium hydroxide pre-treatment and no pre-treatment. The procedures are described in Examples 2 and 3.

Example 2—Hydrophobic Modification of $TiO_2$ Using $NH_4OH$ Pre-Treatment

Ti-R706 $TiO_2$ powder (25 g), water (50 mL), TAMOL 1124 Dispersant (0.25 mL) and 28-30% $NH_4OH$ (0.45 mL) were added to 1-L round bottom flask to form a slurry, which was stirred for 2 h with a motorized overhead mixer at 1950 rpm. The resulting slurry was divided into centrifuge vessels in four equal parts along with additional 75 mL water in each vessel and centrifuged at 14,000 rpm for 3 min. The solid mass collected after centrifugation was broken into small pieces with a spatula, followed by addition of water (150 mL) to each of the four parts. Each sample was subjected to vortex mixing for 5 min followed by ultrasonication for 5 min. Eventually, the samples were centrifuged again at 14,000 rpm for 3 min resulting in wet pastes ($NH_4OH$-R706) with a solids content of 83.8 wt. % $TiO_2$. No further water wash was performed as the solids obtained after centrifugation was free of any ammonia odor.

An aqueous slurry with a pigment solids content of 77.5 wt. % was prepared and hydrophobically modified with a 75:25 mole:mole ratio of MTHS:K-DMDS substantially as described in Example 1.

At 75 wt. % solids (0.43 volume solids fraction), the aqueous slurry of the hydrophobically-modified pigment particles exhibited a shear stress of 0.21 Pa and a viscosity and 2.1 Pa·s at a shear rate of 0.1 s$^{-1}$ without a dispersing agent.

Example 3—Hydrophobic Modification of $TiO_2$ without Base Pre-Treatment

A. Pre-Treatment of $TiO_2$ with Dispersant

Ti-R706 $TiO_2$ powder (250 g), water (500 mL) and TAMOL 1124 Dispersant (2.5 mL) were added to 1-L round bottom flask to form a slurry, which was stirred with a motorized overhead mixer at 1950 rpm for 20 h. The dispersant was removed by transferring the slurry into centrifuge vessels in four equal parts and centrifuging at 14,000 rpm for 3 min. The solid mass collected after centrifugation was broken into small pieces with a spatula, followed by addition of water (250 mL) to each of the four parts. Each sample was subjected to vortex mixing for 5 min followed by ultrasonication for 5 min. The samples were centrifuged again at 14,000 rpm for 3 min resulting in wet pastes with a solids content of 83.8 wt. % $TiO_2$. The entire water-wash process was repeated 2 more times for each sample to create a dispersant free unfunctionalized $TiO_2$ wet paste having an 83.8 wt. % solids content.

An aqueous slurry with a pigment solids content of 77.5 wt. % was prepared and hydrophobically modified with a 75:25 mole:mole ratio of MTHS:K-DMDS substantially as described in Example 1.

For a 75 wt. % solids (0.43 volume solids fraction) aqueous slurry of the hydrophobically-modified pigment particles exhibited a shear stress of 0.5 Pa and a viscosity and 5.0 Pa·s at a shear rate of 0.1 s$^{-1}$ without a dispersing agent.

The invention claimed is:

1. A composition comprising an aqueous dispersion of metal oxide pigment particles coated with an organosilane polymer comprising structural units of an alkyltrihydroxysilane or a salt thereof and a dialkyldihydroxysilane or a salt thereof, wherein a mole:mole ratio of structural units of alkyltrihydroxysilane or a salt thereof to dialkyldihydroxysilane or a salt thereof is in a range of 99.9:1 to 50:50, and wherein the aqueous dispersion has a pH in the range of from 7.5 to 12.

2. The composition of claim 1 wherein the pigment particles are TiO$_2$ particles, and wherein at least 90 weight percent of the organosilane comprises structural units of the alkyltrihydroxysilane or a salt thereof and a dialkyldihydroxysilane or a salt thereof.

3. The composition of claim 2 wherein the mole-to-mole ratio of structural units of the alkyltrihydroxysilane or a salt thereof to the dialkyldihydroxysilane or a salt thereof is in the range of from 60:40 to 90:10; wherein the aqueous dispersion has a pH in the range of 8.5 to 11.

4. The composition of claim 3 wherein the alkyltrihydroxysilane or salt thereof is methyltrihydroxysilane or a salt thereof; and the dialkyldihydroxysilane or salt thereof is dimethyldihydroxysilane or a salt thereof, wherein the mole-to-mole ratio of structural units of the methyltrihydroxysilane or a salt thereof to the dimethyldihydroxysilane or a salt thereof is in the range of from 65:35 to 85:15.

5. The composition of claim 1 wherein the organosilane polymer has a concentration of Si atoms in the range of from 0.1 to 3 weight percent, based on the weight of the polymer and the metal oxide pigment particles.

6. The composition of claim 1 wherein the organosilane polymer has a concentration of Si atoms in the range of from 4 to 120 Si atoms/nm$^2$ of external pigment surface area.

7. The composition of claim 4 which comprises less than 0.09 weight percent of a dispersing agent, based on the weight of the TiO$_2$ particles.

8. A method for preparing an aqueous dispersion of hydrophobically modified pigment particles comprising the step of contacting, in the presence of water and at a pH of from 7.5-12, metal oxide pigment particles with an alkyltrihydroxysilane or a salt thereof and a dialkyldihydroxysilane or a salt thereof where a mole:mole ratio of units of the alkyltrihydroxysilane or a salt thereof to dialkyldihydroxysilane or a salt thereof is in a range of 99.0 to 50:50.

9. The method of claim 8 wherein an aqueous dispersion of the metal oxide pigment particles are pre-treated with a base prior to contact with the alkyltrihydroxysilane or a salt thereof and the dialkyldihydroxysilane or a salt thereof; wherein the metal oxide is TiO$_2$.

10. The method of claim 9 wherein the alkyltrihydroxysilane and the dialkyldihydroxysilane are contacted with the aqueous dispersion of the TiO$_2$ pigment particles as an aqueous solution of a salt of methyltrihydroxysilane and dimethyldihydroxysilane at pH of >12, wherein the aqueous dispersion of TiO$_2$ particles is further contacted separately and concomitantly with an aqueous solution of an acid to maintain a pH in the range of 9 to 10.

* * * * *